United States Patent Office

3,131,165
Patented Apr. 28, 1964

3,131,165
AMIDE STABILIZED FORMALDEHYDE POLYMERS AND PROCESS FOR PREPARING SAME
Hans Dieter Hermann and Edgar Fischer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 22, 1959, Ser. No. 847,871
Claims priority, application Germany Nov. 3, 1958
11 Claims. (Cl. 260—45.9)

The present invention relates to stabilized formaldehyde polymers and a process for preparing same.

It is known that pure, substantially anhydrous formaldehyde can be converted into polymeric formaldehyde in the presence or absence of an inert solvent and in the presence of a catalyst initiating the polymerization, preferably in the presence of a catalyst acting as anion.

The formaldehyde polymers so produced (polyacetals, eupolyoxymethylenes) have the tendency at the necessary processing temperatures of 190–200° C. to substantially depolymerize with reformation of monomeric formaldehyde.

It is also known that the depolymerization of polymeric formaldehyde at a raised temperature can substantially be retarded by the addition of an appropriate stabilizer.

Formaldehyde polymers having an improved stability can be obtained, for example, by reacting carboxylic anhydrides with the polymers, preferably by reacting them with acetic anhydride in the presence of an acid-binding substance. This process is, however, complicated and uneconomical. It necessitates large amounts of carboxylic anhydrides and the stabilized polymer must be carefully washed.

It is also known that formaldehyde polymers having an improved stability can be obtained by admixing the polymer with an organic compound as specified below, in which case the stabilizer is used during the polymerization of formaldehyde or subsequently incorporated into the polyformaldehyde before the processing operation:

The following component may be used as the stabilizer:
(a) Hydrazins, substituted hydrazins and hydrazides,
(b) Secondary or tertiary monomeric aromatic amines,
(c) Phenols or substituted phenols,
(d) Urea, thiourea and their substitution products.

The stabilizers hitherto known have, however, an insufficient efficiency to comply with practical purposes. In addition thereto, polyformaldehydes admixed with a known stabilizer have the tendency to yield colored products after the processing.

We have now found that primary and secondary amides of polybasic carboxylic acids are especially suitable for stabilizing polymeric formaldehyde and derivatives of polymeric formaldehyde, such as acylated, especially acetylated polymeric formaldehyde, which decompose to an extent of less than 80% by weight within 30 minutes at 200° C. under nitrogen. The above amides are superior to the known stabilizers as regards stabilizing efficiency and they are readily available. They enable stable polymers to be prepared which exhibit no or only a very slight coloration after processing.

This is a very surprising result in view of the fact that low molecular weight paraformaldehyde reacts readily under decomposition with carboxylic acid amides with formation of formaldehyde resins and further in view of the fact that amides of monobasic carboxylic acids exert only a minor stabilizing effect on polyformaldehyde. The superior efficiency of polybasic carboxylic acid amides as compared with that of monocarboxylic acid amides is also obvious if the efficiency is related to the same molar concentration of acid amide groups.

In other words, the compounds used according to this invention are very active and can generally be used for stabilizing polymeric formaldehyde to produce thermostable polyformaldehyde.

Polyamides which can advantageously be used for the stabilization of polymeric formaldehyde are oxalic acid diamide and/or compounds of the general formula $R(CONHR_1)_n$, wherein $R$ represents a polyvalent alkyl, cycloalkyl, aryl, aralkyl or a heterocyclic radical and the substitution products of these radicals, $R_1$ a hydrogen atom or an alkyl or cycloalkyl radical having a molecular weight of up to 500, or the substitution products of these alkyl or cycloalkyl radicals, $n$ represents a whole number of at least 2, preferably 2–4.

As stabilizers there may advantageously be used, for example: especially unsubstituted, primary, aliphatic dicarboxylic acid amides, such as the amides of oxalic acid, malonic acid, succinic acid, glutaric acid, adipic acid and sebacic acid, the amides of iminodiacetic acid, nitrilotriacetic acid, diglycolic acid, thiodiglycolic acid, thiodipropionic acid, methoxyphenyliminodiacetic acid, ketoglutaric acid, fumaric acid, aconitic acid, itaconic acid citric acid, tartaric acid, malic acid, 2-chloradipic acid, glutamic acid, aspartic acid, aminomalonic acid, butanetetracarboxylic acid; there may also be used the amides of polyacrylic acid, resorcinol-diacetic acid, cyclohexane-1,4-dicarboxylic acid, cyclohexene-1,2-dicarboxylic acid, 3-nitrocyclohexane-1,2-dicarboxylic acid, camphoric acid, 3-bromo-1,2-dimethyl-cyclopentane-1,3-dicarboxylic acid, terephthalic acid, isophthalic acid, 4-chlorophthalic acid, phenylacetic acid-2-carboxylic acid, 4,5-dimethyl-isophthalic acid, naphthalene-1,4-dicarboxylic acid, anthraquinone-1,8-dicarboxylic acid, pyridine-2,3-dicarboxylic acid, pyrazol-3,5-dicarboxylic acid, 5-methylisooxazol-3,4-dicarboxylic acid; furthermore, the amides mono-substituted at the nitrogen atom of the aforesaid acids, such as the methyl, ethyl, propyl, stearyl, cetyl and cyclohexylamides, and also, for example the 2-hydroxyethyl, 3-chloropropyl, 4-nitrocyclohexyl and 2-propenyl-amides of the aforesaid acids.

The specification of the above stabilizing amides serves only to demonstrate the comprehensive activity of this series of compounds, but it is not intended to be complete.

The stabilizers specified above may be used alone or in admixture with one another or in admixture with other stabilizers, such as phenols, aromatic amines, urea derivatives or hydrazine derivatives and in the presence or absence of an organic solvent, such as carbon tetrachloride, methylene chloride, pentane, heptane, tetrahydrofurane, diethylether, acetone, methylethylketone, methanol or ethanol. The solvent used may contain water.

The amount of stabilizer added depends on its activity and on the quality of the polymer to be stabilized. The stabilizer may be added in an amount of between about 0.01 and about 10% by weight, calculated on the polymer, and preferably in an amount of between 0.1 and 5% by weight, calculated on the polymer.

The polyformaldehyde to be stabilized according to this invention may have been prepared in any desired manner.

The stabilized compositions of this invention are useful for all purposes for which polymers of formaldehyde have hitherto been used, for example, for conversions to films, fibers, molded articles and the like, by conventional methods.

The following examples serve to illustrate the invention but they are not intended to limit it thereto, the parts being by weight unless otherwise stated.

*Example 1*

5 parts polyformaldehyde of which 23% by weight decomposed within 30 minutes at 200° C. under nitrogen were intimately mixed for 10 minutes in a rapid stirrer with 0.1 part malonic acid diamide. The polyformaldehyde so stabilized decomposed within 30 minutes at 200° C. under nitrogen to an extent of 7.5% by weight.

*Example 2*

In the manner described in Example 1, 250 parts of polyformaldehyde of which 11% by weight decomposed within 30 minutes at 200° C. under nitrogen were mixed with 2.5 parts malonic acid diamide. The polyformaldehyde so stabilized decomposed within 30 minutes at 200° C. under nitrogen to an extent of 3.9% by weight.

*Example 3*

3 parts polyformaldehyde were suspended in a solution of 5 parts by volume water and 20 parts by volume methanol and the amounts of malonic acid diamide specified in the table indicated below. After standing for 12 hours at 20° C., the solvent was distilled off, the residue was dried in vacuo and tested as to stability. The results obtained are indicated in the following table.

| Parts malonic acid diamide added | 0 | 0.01 | 0.04 | 0.16 |
|---|---|---|---|---|
| Decomposition in percent by weight within 30 minutes at 200° C. under nitrogen | 23 | 16 | 9 | 8.5 |

*Example 4*

In a manner analogous to that described in Example 3, 0.08 part of substance as specified in the following table was dissolved in each case in 25 parts by volume of the solvents specified in the following table or suspended in finely divided form. The solutions or suspensions so obtained were used to treat, in the manner described above, in each case 3 parts polyformaldehyde which decomposed to an extent of 41% by weight within 30 minutes at 200° C. under nitrogen. The results obtained are indicated in the following table, wherein the proportions of water to organic solvent are proportions by volume.

| Stablizer added | Solvent | Loss in weight in percent after 30 minutes at 200° C. |
|---|---|---|
| Stearic acid hydrazide | $CH_3COCH_3$ | 38 |
| 4-acetaminodiphenylamine | $CH_3COCH_3$ | 32 |
| 4,4'-dihydroxydiphenylsulfone | $C_2H_5OC_2H_5$ | 38 |
| N,N-bis-(2-naphthyl)-thiourea | $C_2H_5OC_2H_5$ | 32 |
| Acetamide | $CH_3COCH_3$ | 37 |
| ω-Caprolactam | $C_2H_5OC_2H_5$ | 40 |
| Acetic acid anilide | $CH_3COCH_3$ | 55 |
| Oxalic acid ethyl ester monodimethylamide | $CH_3COCH_3$ | 43 |
| Oxalic acid diamide | $CH_3COCH_3$ | 25 |
| Malonic acid diamide | $H_2O/CH_3COCH_3$ 1:4 | 9 |
| Succinic acid diamide | $H_2O/CH_3OH$ 1:4 | 19 |
| Adipic acid diamide | $H_2O/CH_3OH$ 1:4 | 30 |
| Sebacic acid diamide | $H_2O/CH_3OH$ 1:4 | 30 |
| Thiodiglycolic acid diamide | $H_2O/CH_3OH$ 1:4 | 16 |
| Thiodiglycolic acid-bis-(N-stearylamide) | $C_6H_6$ | 28 |
| Iminodiacetic acid diamide | $CH_3OH$ | 16 |
| Nitrilotriacetic acid triamide | $H_2O/CH_3OH$ 1:4 | 12 |
| Nitrilotriacetic acid-tri-(N-stearylamide) | $C_6H_6$ | 22 |
| Resorcinol-diacetic acid diamide | $H_2O/CH_3OH$ 1:4 | 28 |
| Tartaric acid diamide | $H_2O/CH_3OH$ 1:4 | 24 |
| Isophthalic acid diamide | $H_2O/CH_3OH$ 1:4 | 25 |
| Polyacrylic acid amide | $H_2O/CH_3OH$ 1:4 | 27 |
| Butane-tetracarboxylic acid-tetramide | $H_2O/CH_3OH$ 1:4 | 21 |
| Citric acid triamide | $H_2O/CH_3OH$ 1:4 | 13 |
| Fumaric acid diamide | $H_2O/CH_3OH$ 1:4 | 11 |

The above table demonstrates the superior stabilizing action of the amides of polybasic carboxylic acids.

*Example 5*

10 parts polymeric formaldehyde which had been acetylized in known manner and which decomposed to an extent of 10% by weight within 30 minutes at 200° C. under nitrogen, were intimately mixed for 5 minutes in a rapid stirrer with 0.1 part citric acid amide. The polymeric formaldehyde so stabilized decomposed within 30 minutes at 200° C. under nitrogen to an extent of 0.5% by weight.

*Example 6*

20 parts polymeric formaldehyde which had been acetylized in known manner were mixed in the manner described in Example 5 with 0.3 part fumaric acid diamide. The decomposition within 30 minutes at 200° C. under nitrogen was reduced from 14.5% by weight to 2.5% by weight.

We claim:

1. A composition of matter comprising a polymeric formaldehyde decomposing to an extent of less than 80 percent by weight within 30 minutes at 200° C., and between about 0.01 and about 10 percent, by weight of the polymeric formaldehyde, of at least one stabilizer critically having at least two —CONH— groups and selected from the group consisting essentially of polyacrylamide, oxalic acid diamide, and compounds of the formula $R(CONHR_1)_n$ wherein R is a polyvalent radical selected from the group consisting of (1) hydrocarbon nuclei, (2) heterohydrocarbon chains interrupted by a member of the group consisting of nitrogen, oxygen, and sulfur atoms, and (3) 5- and 6-membered heterohydrocarbon rings interrupted by a member of the group consisting of nitrogen and oxygen atoms, any substituents on said radical R being selected solely from the group consisting of keto, amino, halo, hydroxy, nitro, and alkoxyphenyl groups, $R_1$ is a member selected from the group consisting of hydrogen and hydrocarbon nuclei, any substituents on said radical $R_1$ being selected solely from the group consisting of halo, hydroxy, and nitro groups, $R_1$ having a molecular weight up to 500, and $n$ is a whole number from 2 to 4.

2. A composition as in claim 1 in which said stabilizer is present in an amount from 0.1 to 5 percent by weight of said polymeric formaldehyde.

3. A composition as in claim 1 wherein said polymeric formaldehyde is an acetylated polymeric formaldehyde.

4. A composition as in claim 1 wherein said stabilizer is oxalic acid diamide.

5. A composition as in claim 1 wherein said stabilizer is malonic acid diamide.

6. A composition as in claim 1 wherein said stabilizer is fumaric acid diamide.

7. A composition as in claim 1 wherein said stabilizer is citric acid triamide.

8. A composition as in claim 1 wherein said stabilizer is nitrilo triacetic acid triamide.

9. A composition as in claim 1 wherein said stabilizer is thiodiglycolic acid diamide.

10. A composition as in claim 1 wherein said stabilizer is imino diacetic acid diamide.

11. A composition as in claim 1 wherein said stabilizer is succinic acid diamide.

References Cited in the file of this patent

UNITED STATES PATENTS

| | | |
|---|---|---|
| 2,296,249 | Austin et al. | Sept. 22, 1942 |
| 2,844,561 | Bechtold et al. | July 22, 1958 |
| 2,966,476 | Kralovec et al. | Dec. 27, 1960 |
| 2,993,025 | Alsup et al. | July 18, 1961 |
| 3,001,966 | Funck et al. | Sept. 26, 1961 |

FOREIGN PATENTS

| | | |
|---|---|---|
| 573,789 | Canada | Apr. 7, 1959 |
| 1,179,858 | France | Dec. 22, 1958 |